April 24, 1934. M. J. TRACY 1,956,086
SAFETY FLUSHING APPARATUS
Filed Nov. 28, 1932 2 Sheets-Sheet 1
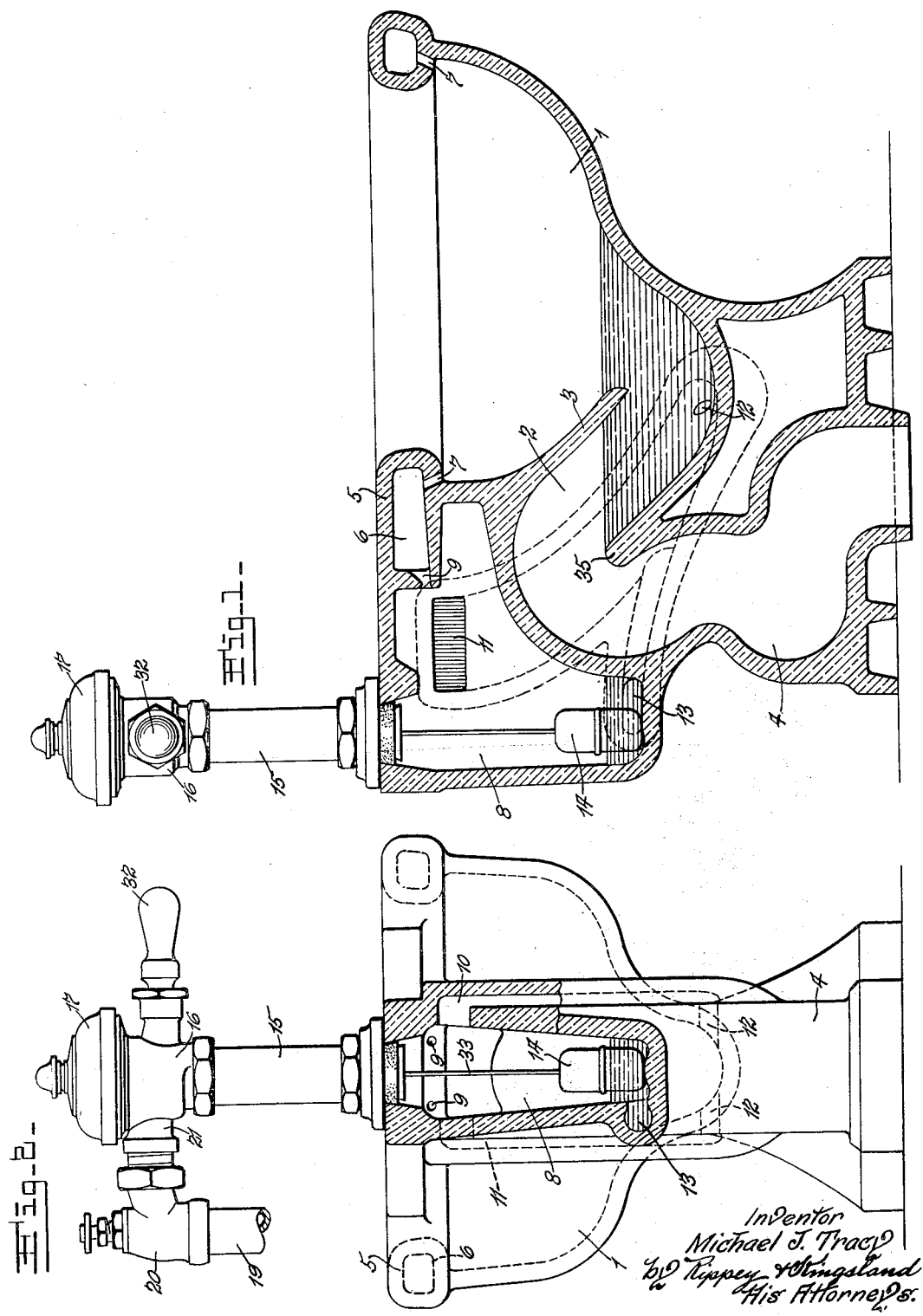
Inventor
Michael J. Tracy
by Tippey & Kingsland
His Attorneys.

April 24, 1934.    M. J. TRACY    1,956,086
SAFETY FLUSHING APPARATUS
Filed Nov. 28, 1932    2 Sheets-Sheet 2
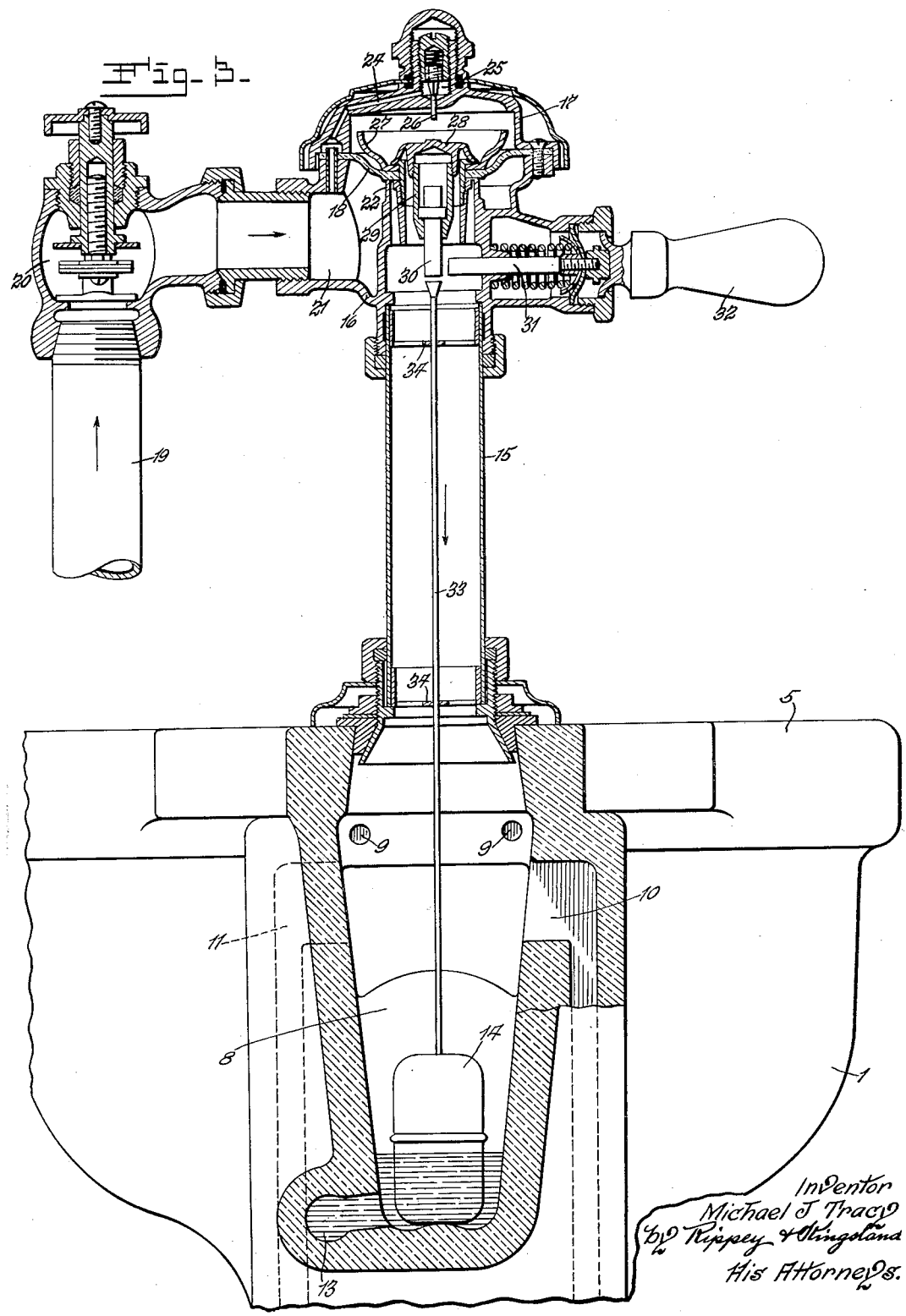
Fig-3-
Inventor
Michael J. Tracy
By Rippey & Kingsland
His Attorneys Patented Apr. 24, 1934

1,956,086

UNITED STATES PATENT OFFICE 1,956,086

SAFETY FLUSHING APPARATUS

Michael J. Tracy, St. Louis County, Mo., assignor to Pauly Jail Building Company, St. Louis, Mo., a corporation of Missouri Application November 28, 1932, Serial No. 644,601

9 Claims. (Cl. 4—75)

This invention relates to safety flushing apparatus having any desired equipment effective to control the flow of water to a bowl; and an object of the invention is to provide equipment comprising a bowl and devices controlling flow of water to the bowl, and construction preventing the bowl from overflowing when the waste outlet becomes obstructed or choked, irrespective of the location of the obstruction.

It is a matter of knowledge that obstruction of the waste outlets from the bowls of flushing devices of many types heretofore used will obstruct or retard the flow of water from the bowl, and that if an excess amount of water is admitted to the bowl when or after the waste outlet is obstructed, the water is likely to overflow from the bowl. Bowls have been constructed with water inlet jets opening into the outlet passage from the main body of the bowl in order to utilize the jets of water to expedite siphoning the contents of the bowl.

Another object of the present invention is to provide a construction and arrangement whereby the bowl is prevented from overflowing, irrespective of the location of the obstruction that retards the flow of the water from the bowl, and to provide means for draining the water from the bowl into the waste outlet if the obstruction is between the jet opening and the inside of the bowl.

Another object of the invention is to provide means which will operate or be operated automatically and as an incident to the choking or obstruction of the waste outlet of the bowl beyond the jet opening and when the water in the waste outlet and in the bowl rises to or above a predetermined height. This means will prevent effective operation of the devices controlling the admission of water into the bowl either intentionally or unintentionally when the waste outlet is clogged, thereby making it impossible for anyone to cause the bowl to overflow when or after the waste outlet from the bowl becomes choked or obstructed.

Other objects will appear from the following description, reference being made to the accompanying drawings, in which—

Fig. 1 is a vertical front to rear section of the bowl embodying principal features of the present invention.

Fig. 2 is a rear elevation of the bowl, the float chamber being in vertical cross section.

Fig. 3 is a vertical cross sectional view of the float chamber of the bowl and of one form of mechanism that is operated automatically and as an incident to the retention of an excessive amount of water in the bowl to prevent admission of additional amounts of water to the bowl.

The improved bowl that constitutes an element of the combination forming the present invention may be made of porcelain, or of other vitreous materials, or different substances, as desired. In the embodiment shown, this bowl comprises a water basin 1 having an outlet opening 2 into which the water and waste substances from the bowl 1 pass below the edge of a partition 3 which cooperates with the walls of the bowl 1 to form the outlet passage 2. The passage 2 opens into the waste outlet 4 communicating with any discharge conduit or sewer.

The upper end of the bowl is formed in connection with a tubular wall 5 providing a passage 6 into and through which the water from the supply pipe flows and from which the water is discharged through numerous openings 7 in order to wash and cleanse the inner surface of the wall of the bowl and drive the contents of the bowl out through the outlet passage 2 and the waste outlet 4.

A water receiving and float chamber 8 at the rear of the bowl discharges water into the tubular passage 6 through a restricted passage 9.

Two opposite passages 10 and 11 from the upper portion of the chamber 8 have openings 12 near the bottom of the bowl 1 and within the communication from the bowl 1 to the outlet passage 2. The openings from the water and float chamber 8 into the passages 10 and 11 do not prevent water from flowing through the passage 9 into the passage 6, because the water that is admitted to the chamber 8 from the source of supply is in sufficient volume to rise above the openings into the passages 10 and 11 and into the passage 6 through the opening 9. From the bottom of the chamber 8 a passage 13 opens into one of the passages 10 or 11, so that when the waste outlet 4 becomes obstructed or choked and the flow of water from the bowl is retarded or obstructed, water will rise in the chamber 8 and operate the float device 14 therein.

Water is admitted into the chamber 8 from any source of supply through a pipe 15. Flow of water into the chamber 8 from the pipe 15 may be controlled in numerous ways, and it is immaterial from what source the water is taken. Specifically it is immaterial whether the water is taken directly from the water main or supply pipe or from a tank, or other container or receptacle. In some aspects of the invention, the form of the mechanism controlled by the float device 14 in order to control flow of water into the chamber 8 is immaterial. However, for illustrative purposes, I have shown in the annexed drawings a valve mechanism controlled by the float device 14 in order to prevent admission of an additional amount of water into the bowl when the waste outlet 4 is obstructed.

The receiving capacity of the passages 10 and 11 through the openings thereto from the chamber 8 is greater than the receiving capacity of the passage 6 through the openings 9, so that only a relatively small amount of water may enter the passage 6 as compared with the amount of water that enters and is discharged through the passages 10 and 11. This construction and arrangement constitutes receiving capacities of the continuous passage 6 and the passages 10 and 11 from the communication chamber 8 to the outlet passage in such proportion as to prevent water from rising in the bowl above the continuous passage 6 and from overflowing.

The lower end of the pipe 15 opens into the upper end of the chamber 8 and has in connection with its upper end the lower end 16 of a valve housing. The upper member of the valve housing comprises a dome 17, the periphery of a flexible diaphragm member 18 being secured between the housing members 16 and 17.

A water supply pipe 19 opens through a valve regulator device 20 into a chamber 21 in the housing member 16 below the diaphragm 18 and surrounding the upwardly extended valve seat 22 upon which a central circular portion of the diaphragm 18 seats. A chamber 23 is thus provided above the diaphragm 18 and within the housing member 17.

A passage 24 from the chamber 21 through the wall of the housing member 16, through the diaphragm 18 and through the wall of the housing member 17 opens into a chamber 25 in the upper portion of the housing member 17 so as to admit water to said chamber 25 from the chamber 21. A valve device 26 controls flow of water from the chamber 25 into the chamber 23.

The diaphragm 18 has a central opening and the marginal portion of said diaphragm around said opening is engaged with a valve device 27 having a central opening therethrough controlled by a relatively movable valve 28. The area of the surfaces of the diaphragm 18, the valve member 27 and the valve 28 within the housing member 17 is greater than the area of the under surface of the diaphragm member 18 forming the upper wall of the chamber 21. When the device is idle, the chamber 23 is filled with water passing thereto through the passage 24 and the valve device 26 and is subjected to the same pressure as the pressure in the chamber 21. Accordingly, the valve, including the parts 18, 27 and 28, will be held closed because an equal amount of pressure per square inch is applied to both sides of the valve and the area of the upper side of the valve within the chamber 23 is greater than the area of the valve above the chamber 21. The valve 28 is a pilot valve and is seated upon the marginal portion of the member 27 and is operative to open and to close the opening through the member 27 so as to permit water to flow from the chamber 23 into the pipe 15. The valve 28 has a tubular part 29 extending downwardly. A stem 30 is supported by the tubular extension 29 and is movable in said extension. When the valve 28 is closed and the stem 30 is in its downward position, said stem 30 is opposite the inner end of an actuator stem 31 operated by an oscillating handle 32 effectively to push the stem 30 laterally and thereby tilt the valve 28 to open position and permit water to flow from the chamber 23 into the pipe 15. This relieves and lowers the pressure against the upper side of the valve, comprising the members 18 and 27, so that said valve will be raised and water can flow from the chamber 21 below the valve 28 into the pipe 15 and thence into the chamber 8. From the chamber 8, a part of this water flows through the passage 9 into the passage 6 and through the openings 7 along the inner surface of the wall of the bowl 1 and the remainder of the water flows through the passages 10 and 13 through the jet openings 12 and thus causes a siphon action driving the water from the bowl 1.

A rod 33 has its lower end connected with the float device 14. This rod extends upward through the chamber 8 and through the pipe 15 and has its upper end below and in alinement with the lower end of the stem 30, so that upward movement of the float 14 will raise the stem 30 above the inner end of the actuator stem 31 and thereby prevent operation of the stem 30 by the actuator stem 31. The rod 33 operates through guides 34 and is thereby held in alinement with the stem 30, but these guides do not interfere with the freedom of the vertical movements of said rod 33.

It is now clear that if the communication from the bowl 1 to the passage 2 below the wall 3 becomes closed, water cannot pass from the bowl 1 directly into the passage 2, although water will not be retained in the passage 2 to any height above the overflow ledge 35. Successive admissions of water into the bowl 1 will eventually fill the bowl to a height in which the water will flow back through the passage 6 and the passage 9 into the chamber 8 and thence through the passages 10 and 13 and the jet openings 12 into the passage 2 and the passage 4. Thus, it is impossible to cause the bowl to overflow even if the communication from the bowl to the passage 2 be completely closed.

If the passage 4 be closed, the water will be retained in the chamber 8 which will raise the float device 14 and cause the rod 33 to move and support the stem 30 above the end of the stem 31. When the stem 30 is supported above the end of the stem 31, said stem 31 may be repeatedly operated without effect and the valve 28 will not be opened thereby. Neither will the valve device 18—27 be opened, so that operations of the handle 32, during the time that the stem 30 is supported in its raised position, are ineffective.

It is now clear that this invention prevents overflow of the bowl 1 whether communication from the bowl 1 to the passage 2 or whether the passage 4 be clogged. This is because there is an effective by-pass for the water from the bowl 1 through the passages 6, 9, 10 and 12 if communication from the bowl 1 to the passage 2 be closed. And, if the passage 4 be closed preventing outflow of the water through the waste passage, the supply regulator device is disabled and no water can be discharged into the bowl.

Accordingly, this invention obtains all of its intended objects and purposes in a highly satisfactory and efficient manner. The construction and arrangement of the invention may be varied within the scope of equivalent limits without departure from the nature and principle thereof. I contemplate such variations as may be required to adapt the invention for its intended uses in its different embodiments and, without restricting myself in unessential particulars, I claim:

1. A flushing apparatus comprising a bowl to be flushed having an outlet passage opening from the lower portion of the bowl, a wall in said bowl forming the upper side of said outlet passage, walls forming a water receiving chamber, walls forming a passage near the top of the bowl having an opening at the bottom thereof into said chamber and having openings through the bottom thereof into the bowl, and means other than any of said walls forming a passage opening from said chamber below said opening that opens into said first named passage and opening into the bowl toward the effluent side of the opening from said bowl into said outlet passage.

2. A flushing apparatus comprising a bowl to be flushed having walls forming an outlet passage opening from the lower portion of the bowl, means forming an inlet passage to the bowl, and walls other than said first named walls forming a continuous passage from the inside of the bowl to said inlet passage and thence to said outlet passage at the effluent side of the opening from the bowl into said outlet passage and determining the height to which the water may rise in the bowl when said opening from said bowl to said outlet passage is obstructed.

3. A flushing apparatus comprising a bowl to be flushed having walls forming an outlet passage opening from the lower portion of the bowl, means forming a water supply passage for conducting water toward the bowl, and walls other than said first named walls forming a continuous passage from the inside of the bowl to communication with said supply passage into said outlet passage, the receiving capacities of said continuous passage and said passage from said supply passage to said outlet passage being proportioned to prevent water from rising in the bowl above said continuous passage.

4. A flushing apparatus comprising a bowl to be flushed having an outlet passage opening from the lower portion of the bowl, walls forming a continuous passage communicating with the inside of the upper portion of the bowl, walls forming a passage from said continuous passage and opening into said outlet passage and having a greater receiving capacity than the capacity of said continuous passage, manually operative devices operative to admit water to said passages and thereby to said bowl, and means preventing effective manual operation of said devices operated and controlled by water retained in said outlet passage.

5. A flushing apparatus comprising a bowl to be flushed having walls forming an outlet passage opening from the lower portion of the bowl and having a passage for admitting water into and conducting water from the upper portion of the bowl, means forming a water receiving chamber having a restricted opening into said second passage, and means other than said walls forming passages opening from said chamber into the lower portion of the bowl adjacent to said outlet passage.

6. A flushing apparatus comprising a bowl to be flushed having walls forming an outlet passage opening from the lower portion of the bowl and having a passage for admitting water into and conducting water from the upper portion of the bowl, means forming a water receiving chamber having a restricted opening into said second passage, means other than said walls forming passages opening from said chamber into the lower portion of the bowl adjacent to said outlet passage, and mechanism preventing the admission of water into said chamber and said bowl when an excess amount of water is retained in said outlet passage.

7. A flushing apparatus comprising a bowl to be flushed having walls forming an outlet passage opening from the lower portion of the bowl, walls forming a water receiving chamber, a device controlling admission of water into said chamber, walls forming a passage for conducting water from said chamber into the upper portion of the bowl and from the upper portion of the bowl into said chamber, means other than any of said walls forming a passage opening from the upper portion of said chamber below the opening into said first passage and also opening into said outlet passage, means forming a passage for draining water from said chamber, and means in said chamber and operated by an excess amount of water retained in said chamber preventing effective operation of said device controlling admission of water into said chamber.

8. A flushing apparatus comprising a bowl to be flushed having walls forming an outlet passage opening from the lower portion of the bowl, a water receiving chamber, means for conducting water from said water receiving chamber into the upper portion of the bowl and from the upper portion of the bowl into said chamber, means other than said walls forming a passage for conducting water from the upper portion of said chamber into said outlet passage, means for discharging water from the lower portion of said chamber, mechanism controlling admission of water into said chamber, and a device mounted in said chamber controlling effective operation of said mechanism.

9. As an article of manufacture, a bowl of the character described having an outlet passage, wall structure integral with said bowl forming a chamber adapted to receive water to flush the bowl and forming a passage opening into the upper end of said bowl and another passage opening from the upper end of said chamber into the lower portion of said bowl, and other wall structure integral with said bowl forming a passage opening from the lower end of said chamber and opening into the lower portion of said bowl.

MICHAEL J. TRACY.